United States Patent
Enoki et al.

(10) Patent No.: US 11,626,257 B2
(45) Date of Patent: Apr. 11, 2023

(54) ELECTRODE FOR ALUMINUM ELECTROLYTIC CAPACITOR AND METHOD FOR MANUFACTURING SAME

(71) Applicants: NIPPON LIGHT METAL COMPANY, LTD., Tokyo (JP); TOYO ALUMINIUM K. K., Osaka (JP)

(72) Inventors: Shuhei Enoki, Shizuoka (JP); Yuta Shimizu, Shizuoka (JP); Masahiko Katano, Shizuoka (JP); Toshifumi Taira, Osaka (JP); Kazuya Fujimoto, Osaka (JP); Shinya Sone, Osaka (JP)

(73) Assignees: NIPPON LIGHT METAL COMPANY, LTD., Tokyo (JP); TOYO ALUMINIUM K. K., Osaka (JP)

(*) Notice: Subject to any disclaimer, the term of this patent is extended or adjusted under 35 U.S.C. 154(b) by 482 days.

(21) Appl. No.: 16/634,188

(22) PCT Filed: Jun. 5, 2018

(86) PCT No.: PCT/JP2018/021518
§ 371 (c)(1),
(2) Date: Feb. 26, 2020

(87) PCT Pub. No.: WO2019/021638
PCT Pub. Date: Jan. 31, 2019

(65) Prior Publication Data
US 2020/0227209 A1    Jul. 16, 2020

(30) Foreign Application Priority Data
Jul. 28, 2017 (JP) .............................. JP2017-146003

(51) Int. Cl.
*H01G 9/00* (2006.01)
*H01G 9/045* (2006.01)
(Continued)

(52) U.S. Cl.
CPC ........... *H01G 9/052* (2013.01); *H01G 9/0029* (2013.01); *H01G 9/045* (2013.01); *H01G 9/048* (2013.01)

(58) Field of Classification Search
CPC ........ H01G 9/055; H01G 9/052; H01G 9/048; H01G 9/045; H01G 9/0029
See application file for complete search history.

(56) References Cited

U.S. PATENT DOCUMENTS

2003/0224110 A1* 12/2003 Lessner ............... H01G 9/035
427/430.1

FOREIGN PATENT DOCUMENTS

| CN | 105405658 A | * | 3/2016 | ............. C25D 11/08 |
| JP | S59-89796 A |   | 5/1984 | |

(Continued)

OTHER PUBLICATIONS

WIPO, International Search Report for International Application No. PCT/JP2018/021518, dated Sep. 4, 2018.

*Primary Examiner* — David M Sinclair

(57) ABSTRACT

When manufacturing an electrode for an electrolytic capacitor, in a first hydration step (ST1), an aluminum electrode is immersed in a first hydration processing solution having a temperature of at least 70° C. and comprising pure water or an aqueous solution to which phosphoric acid or a phosphate has been added so that the phosphorus concentration is no greater than 4 mass ppm. In a second hydration step (ST2), the aluminum electrode is immersed in a second hydration processing solution to which phosphoric acid or a phosphate has been added so that the phosphorus concentration is 4-5000 mass ppm, the second hydration processing solution having a pH of 3.0-9.0 and a temperature of at least 70° C. In a chemical conversion step (ST3), at least a boric acid chemical conversion process in which the aluminum electrode is chemically converted in a boric acid-based chemical (Continued)

conversion solution is included, and a chemical conversion coating having a coating withstand voltage of at least 200 V is formed on the aluminum electrode.

8 Claims, 7 Drawing Sheets

(51) Int. Cl.
*H01G 9/048* (2006.01)
*H01G 9/052* (2006.01)

(56) References Cited

FOREIGN PATENT DOCUMENTS

| | | | |
|---|---|---|---|
| JP | S60-35511 A | 2/1985 | |
| JP | S60-35512 A | 2/1985 | |
| JP | S60-35513 A | 2/1985 | |
| JP | H04-364019 A | 12/1992 | |
| JP | 09275040 A * | 10/1997 | ............ C25D 11/08 |
| JP | H11-054381 A | 2/1999 | |
| JP | 2000-003835 A | 1/2000 | |
| JP | 3295841 B2 | 6/2002 | |
| JP | 2007036048 A * | 2/2007 | |
| KR | 101273348 B1 * | 6/2013 | |

* cited by examiner

ELECTRODE FOR ALUMINUM ELECTROLYTIC CAPACITOR AND METHOD FOR MANUFACTURING SAME

FIELD

The present invention relates to an electrode for an aluminum electrolytic capacitor having an aluminum electrode on which chemical conversion is performed and a method for manufacturing the same.

BACKGROUND

For manufacturing an electrode for an aluminum electrolytic capacitor having an aluminum electrode on which a chemical conversion coating having a coating withstand voltage of 200 V or higher is formed, a hydration step of immersing the aluminum electrode in a hydration processing solution such as pure water to form a hydrated film on the aluminum electrode is performed, and then a chemical conversion step of performing chemical conversion on the aluminum electrode in a chemical conversion solution is performed. As the chemical conversion solution, an organic acid-based chemical conversion solution to which ammonium adipate, for example, is added or a boric acid-based chemical conversion solution containing boric acid or a salt thereof is used. When an organic acid-based chemical conversion solution is used as the chemical conversion solution, a higher electrostatic capacitance than in the case of using a boric acid-based chemical conversion solution can be obtained.

However, in the case of using an organic acid-based chemical conversion solution, there is a problem in which the organic acid-based chemical conversion solution left remaining in the chemical conversion coating or a porous layer of the aluminum electrode burns during the subsequent thermal depolarization treatment thereby breaking the chemical conversion coating or the porous layer. In contrast, using a boric acid-based chemical conversion solution is advantageous in that such burning does not occur during thermal depolarization treatment unlike the case of using an organic acid-based chemical conversion solution, and a higher sparkover voltage than in the case of using an organic acid-based chemical conversion solution is obtained.

As for chemical conversion at a medium and high voltage, techniques are proposed (see Patent Literatures 1 to 5) in which, after the hydration step, an aluminum electrode is immersed in a phosphoric acid aqueous solution, for example, and then the chemical conversion step is performed. For example, in the technique described in Patent Literature 1, after the hydration step, an aluminum electrode is immersed at a temperature of 60° C. for 5 minutes in a processing solution containing hypophosphorous acid, phosphorous acid, or a salt thereof, for example, as a reducing agent at 0.05 mass % to 5.0 mass %, and then the chemical conversion step is performed thereon, whereby a leakage current is reduced. In the technique described in Patent Literature 2, after the hydration step, an aluminum electrode is immersed in a processing solution to which phosphoric acid as a weak acid is added, and then the chemical conversion step is performed, whereby hydration resistance of the chemical conversion coating is increased. In the techniques described in Patent Literatures 3 to 5, after the hydration step, an aluminum electrode is immersed in a processing solution to which phosphoric acid is added, whereby a feathery film on a hydrated film surface formed at the chemical conversion step is removed, and then the chemical conversion step is performed.

CITATION LIST

Patent Literature

Patent Literature 1: Japanese Patent No. 3295841
Patent Literature 2: Japanese Unexamined Patent Publication No. S59-89796
Patent Literature 3: Japanese Unexamined Patent Publication No. S60-35511
Patent Literature 4: Japanese Unexamined Patent Publication No. S60-35512
Patent Literature 5: Japanese Unexamined Patent Publication No. S60-35513

SUMMARY

Technical Problem

As a result of studies on manufacture of an electrode for an aluminum electrolytic capacitor having a high electrostatic capacitance using a boric acid-based chemical conversion solution, the inventors of the present invention obtained a new finding that, when a chemical conversion step is performed using a boric acid-based chemical conversion solution, the electrostatic capacitance decreases as the amount of boron taken into the chemical conversion coating increases as illustrated in FIG. 6 (graph illustrating a relation between the boron content in the chemical conversion coating and the electrostatic capacitance). This is because it is considered that, when chemical conversion is performed using a boric acid-based chemical conversion solution, a borate ion adsorbed on a hydrated film is taken into the chemical conversion coating, whereby the permittivity of the chemical conversion coating is reduced. The inventors also obtained a new finding that the amount of boric acid taken into the chemical conversion coating is affected by the hydrated film formed at a hydration step before the chemical conversion step. It was also found through many experiments that it is effective to strongly bond phosphorus to the hydrated film in order to reduce the amount of boric acid to be taken, and to do so, it is effective to hydrate an aluminum electrode, on which the hydration step (first hydration step) has been performed, in an aqueous solution containing phosphorus at a temperature of 70° C. or higher.

When the techniques described in Patent Literatures 1 to 5 are used for a hydrated film that is formed before performing the chemical conversion step, reduction of the amount of boron in the chemical conversion coating is insufficient. This is because, in any techniques described in Patent Literatures 1 to 5, even if an aluminum electrode is immersed in a processing solution containing phosphorus after the hydrated film is formed at the hydration step, the amount of phosphoric acid strongly bonded to the hydrated film is small or only the surface layer of the hydrated film dissolves when the aluminum electrode is immersed in a processing solution containing phosphorus. Thus, it is considered that, when chemical conversion is performed in a boric acid-based chemical conversion solution, adsorption of a borate ion onto the hydrated film cannot be suppressed by the hydrated film to which phosphoric acid is bonded, and thus boric acid cannot be prevented from being taken into the chemical conversion coating.

In the technique described in Patent Literature 1, at a second step after the hydration step (first step), an aluminum electrode is immersed in a processing solution containing hypophosphorous acid, phosphorous acid, or a salt thereof, for example, at 0.05 mass % to 5.0 mass %, and thus a hydrated film formed at the hydration step may be dissolved at the second step. In this case, it is considered that, because formation of a chemical conversion coating by dehydration reaction of the hydrated film is suppressed, chemical conversion takes a longer time, and the amount of boric acid taken into the chemical conversion coating accordingly increases. In the technique described in Patent Literature 1, because the aluminum electrode is immersed in the processing solution having a low temperature of 60° C. at the second step, the amount of phosphoric acid that is strongly bonded to the hydrated film is small and the amount of phosphoric acid that is weakly bonded to the hydrated film is large. Thus, at the subsequent chemical conversion step, phosphoric acid is more likely to be separated from the hydrated film to be eluted into the chemical conversion solution. This causes a problem in which the phosphate concentration in the chemical conversion solution increases, a normal chemical conversion coating is not formed, the number of defects in the chemical conversion coating increases, and the hydration resistance decreases.

In view of the above-described problems, an object of the present invention is to provide an electrode for an aluminum electrolytic capacitor having a high hydration resistance and being capable of improving electrostatic capacitance and a method for manufacturing the same.

Solution to Problem

In order to solve the above-described problems, the present invention is directed to an electrode for an aluminum electrolytic capacitor, the electrode having an aluminum electrode on which a chemical conversion coating having a coating withstand voltage of 200 V or higher is formed, in which boron content in the chemical conversion coating is 100 mass ppm to 6000 mass ppm. Hydration resistance is 100 seconds or shorter, the hydration resistance being a period of time (seconds) until a voltage corresponding to 90% of a rated coating withstand voltage is reached when a 10 mm×50 mm electrode for an aluminum electrolytic capacitor is immersed in pure water having a temperature of 95° C. or higher for 60±1 minutes and then a constant direct current of 2.0±0.2 mA is flown in a 7-mass % boric acid aqueous solution (specific resistance at a temperature of 70±2° C. is 75±3 Ωm, and pH at a temperature of 50±2° C. is 2.7 to 4.2) having a temperature of 85±2° C.

In the electrode for an aluminum electrolytic capacitor according to the present invention, the chemical conversion coating is formed using the boric acid-based chemical conversion solution, and thus the chemical conversion coating contains boron. However, the boron content in the chemical conversion coating is 100 mass ppm to 6000 mass ppm, and the boron content in the chemical conversion coating is lower than those in the conventional examples. Thus, reduction of permittivity due to boric acid or boron in the chemical conversion coating can be suppressed, whereby electrostatic capacitance can be improved. Furthermore, because the hydration resistance is 100 seconds or shorter, the hydration resistance is excellent.

The present invention is effective particularly when the coating withstand voltage is 400 V or higher.

In the electrode for an aluminum electrolytic capacitor according to the present invention, the number of voids that are exposed on a cut surface when the chemical conversion coating is cut is preferably 150 voids/μm² or smaller. In this embodiment, the number of voids (defects) that are exposed on a cut surface when the chemical conversion coating is cut is 150 voids/μm² or smaller, and thus the number of defects in the chemical conversion coating is smaller than those in the conventional examples. Consequently, water is less likely to enter from the surface of the chemical conversion coating, and thus the chemical conversion coating is less likely to undergo deterioration caused by hydration, whereby the hydration resistance of the chemical conversion coating can be improved.

A method for manufacturing an electrode for an aluminum electrolytic capacitor according to the present invention includes: a first hydration step of immersing an aluminum electrode in a first hydration processing solution having a temperature of 70° C. or higher and including pure water or an aqueous solution to which phosphoric acid or a phosphate has been added such that phosphorus concentration is 4 mass ppm or lower; a second hydration step of, after the first hydration step, immersing the aluminum electrode in a second hydration processing solution to which phosphoric acid or a phosphate has been added such that the phosphorus concentration is 4 mass ppm to 5000 mass ppm, the second hydration processing solution having a pH of 3.0 to 9.0 and a temperature of 70° C. or higher; and a chemical conversion step of, after the second hydration step, forming on the aluminum electrode a chemical conversion coating having a coating withstand voltage of 200 V or higher, the chemical conversion step including at least a boric acid chemical conversion process of performing chemical conversion on the aluminum electrode in a boric acid-based chemical conversion solution.

In the method for manufacturing an electrode for an aluminum electrolytic capacitor according to the present invention, a hydrated film is formed on the aluminum electrode at the first hydration step, and then the aluminum electrode is immersed at the second hydration step in the second hydration processing solution to which phosphoric acid or a phosphate has been added such that the phosphorus concentration is 4 mass ppm to 5000 mass ppm. At this time, the second hydration processing solution has a low phosphorus concentration and a pH of 3.0 to 9.0, and thus, in the aluminum electrode, growth of the hydrated film to which phosphoric acid is bonded progresses more than dissolution of the hydrated film formed at the first hydration step. At the second hydration step, because the temperature of the second hydration processing solution is 70° C. or higher, the hydrated film to which phosphoric acid is strongly bonded grows. When chemical conversion is performed on the aluminum electrode on which the hydrated film has been formed in this manner, the boron content in the chemical conversion coating is 100 mass ppm to 6000 mass ppm, and the boron content in the chemical conversion coating is low. Thus, reduction of permittivity due to boric acid or boron in the chemical conversion coating can be suppressed, whereby the electrostatic capacitance can be improved. It is considered that this is because phosphoric acid is strongly bonded to the hydrated film formed at the second hydration step, whereby boric acid in the chemical conversion solution is prevented from being adsorbed on the hydrated film, and thus the boric acid is prevented from being taken into the chemical conversion coating. It is also considered that, at the second hydration step, because the temperature of the second hydration processing solution is 70° C. or higher, the phosphoric acid can be prevented from being separated from the hydrated film and being eluted into the chemical conversion solution at the chemical conversion step. Thus, the phosphate concentration in the chemical conversion solution can be prevented from increasing, whereby the chemical conversion coating is formed appropriately. Consequently, the number of defects in the chemical conversion coating can be reduced, whereby the hydration resistance can be improved. Herein, when chemical conversion is performed in the boric acid-based chemical conversion solution, because it is difficult for the chemical conversion coating to avoid containing boron, various experiments revealed that the chemical conversion coating will contain boron at at least 100 mass ppm.

The present invention is effective particularly when a chemical conversion coating having a coating withstand voltage of 400 V or higher is formed at the chemical conversion step.

In the method for manufacturing an electrode for an aluminum electrolytic capacitor according to the present invention, the coating withstand voltage Vf (V) and x mass % preferably satisfy a conditional formula:

$$(0.01 \times Vf) \leq x \leq (0.017 \times Vf + 28)$$

where x mass % is, at a time when the first hydration step and the second hydration step have been completed, a ratio of the mass of the hydrated film formed on the aluminum electrode by the first hydration step and the second hydration step to the mass of the aluminum electrode before the first hydration step. When the amount of the hydrated film is smaller than the lower limit of the above conditional formula, excessive heat is generated at the chemical conversion step, and a stable chemical conversion coating is not formed. When the amount of the hydrated film is larger than the upper limit of the above conditional formula, the chemical conversion solution is hindered from penetrating into defects of the chemical conversion coating by the thickly formed hydrated film, whereby repair of the defects of the chemical conversion coating is hindered.

In the method for manufacturing an electrode for an aluminum electrolytic capacitor according to the present invention, the phosphorus concentration in the chemical conversion solution used at the chemical conversion step is preferably 4 mass ppm or lower. At the chemical conversion step, phosphoric acid is separated from the hydrated film to be eluted into the chemical conversion solution. In this case, if the phosphorus concentration in the chemical conversion solution exceeds 4 mass ppm, a stable chemical conversion coating is not formed, the number of defects in the chemical conversion coating, and the hydration resistance decreases. In contrast, if the phosphorus concentration in the chemical conversion solution is 4 mass ppm or lower, a stable chemical conversion coating is formed, and the number of defects in the chemical conversion coating can be reduced, whereby the hydration resistance can be improved.

In the present invention, an embodiment may be provided in which the second hydration processing solution contains one type or two types or more of orthophosphoric acid, hypophosphorous acid, phosphorous acid, diphosphoric acid, ammonium dihydrogenphosphate, diammonium hydrogenphosphate, and triammonium phosphate.

Advantageous Effects of Invention

In the electrode for an aluminum electrolytic capacitor according to the present invention, the chemical conversion coating is formed using the boric acid-based chemical conversion solution, and thus the chemical conversion coating contains boron. However, the boron content in the chemical conversion coating is 100 mass ppm to 6000 mass ppm, and the boron content in the chemical conversion coating is lower than those in the conventional examples. Thus, reduction of permittivity due to boric acid or boron in the chemical conversion coating can be suppressed, whereby electrostatic capacitance can be improved.

In the method for manufacturing an electrode for an aluminum electrolytic capacitor according to the present invention, a hydrated film is formed on the aluminum electrode at the first hydration step, and then the aluminum electrode is immersed at the second hydration step in the second hydration processing solution to which phosphoric acid or a phosphate has been added such that the phosphorus concentration is 4 mass ppm to 5000 mass ppm. At this time, the second hydration processing solution has a low phosphorus concentration and a pH of 3.0 to 9.0, and thus, in the aluminum electrode, growth of the hydrated film to which phosphoric acid is bonded progresses more than dissolution of the hydrated film formed at the first hydration step. At the second hydration step, because the temperature of the second hydration processing solution is 70° C. or higher, the hydrated film to which phosphoric acid is strongly bonded grows. When chemical conversion is performed on the aluminum electrode on which the hydrated film has been formed in this manner, the boron content in the chemical conversion coating is 100 mass ppm to 6000 mass ppm, and the boron content in the chemical conversion coating is low. Thus, reduction of permittivity due to boric acid or boron in the chemical conversion coating can be suppressed, whereby the electrostatic capacitance can be improved. At the second hydration step, because the temperature of the second hydration processing solution is 70° C. or higher, the phosphoric acid can be prevented from being separated from the hydrated film and being eluted into the chemical conversion solution at the chemical conversion step. Thus, the phosphate concentration in the chemical conversion solution can be prevented from increasing, whereby the chemical conversion coating is formed appropriately. Consequently, the number of defects in the chemical conversion coating can be reduced, and thus the hydration resistance can be improved.

Figure 1:
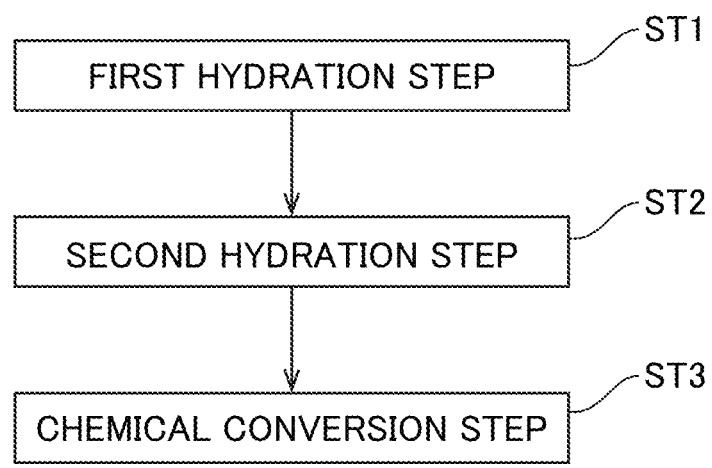
FIG. 1 is a flowchart illustrating a method for manufacturing an electrode for an aluminum electrolytic capacitor to which the present invention is applied.

DESCRIPTION OF EMBODIMENTS (Electrode for Aluminum Electrolytic Capacitor)

In the present invention, for manufacturing an electrode for an aluminum electrolytic capacitor, chemical conversion is performed on a surface of an aluminum electrode to manufacture the electrode for an aluminum electrolytic capacitor. As the aluminum electrode, foil formed by etching aluminum foil or a porous aluminum electrode formed by sintering aluminum powder and laminating the resultant porous layers onto both surfaces of an aluminum core material, for example, may be used. The foil formed by etching aluminum foil includes a porous layer in which tunnel-like pits are commonly formed. In the porous aluminum electrode, for example, porous layers each having a thickness of 5 micrometers to 1000 micrometers are each formed on both surfaces of the aluminum core material having a thickness of 10 micrometers to 200 micrometers. Each porous layer is a layer formed by sintering aluminum powder having an average particle diameter D50 of 0.5 micrometer to 100 micrometers, and the aluminum powder is sintered while pores are being retained with each other.

(Constitution of Aluminum Electrolytic Capacitor)

In order to manufacture an aluminum electrolytic capacitor using the aluminum electrode after chemical conversion (the electrode for an aluminum electrolytic capacitor), for example, a capacitor element is formed by winding anode foil made of the aluminum electrode after chemical conversion (the electrode for an aluminum electrolytic capacitor) and cathode foil with a separator interposed therebetween. Subsequently, the capacitor element is impregnated with an electrolytic solution (a paste). Thereafter, the capacitor element including the electrolytic solution is placed in an outer case, and the case is sealed with a sealing body. In the aluminum electrolytic capacitor having the constitution described above, when the hydration resistance of the chemical conversion coating is low, the chemical conversion coating may deteriorate due to water contained in the air during a period when the electrode for an aluminum electrolytic capacitor is stored, and consequently the characteristics of the aluminum electrolytic capacitor may deteriorate. Furthermore, after the aluminum electrolytic capacitor has been manufactured, if the chemical conversion coating deteriorates due to the water contained in the electrolytic solution, the reliability of the aluminum electrolytic capacitor decreases. Thus, the electrode for an aluminum electrolytic capacitor is required to have a high hydration resistance.

When a solid electrolyte is used instead of the electrolytic solution, a solid electrolyte layer is formed on the surface of the anode foil made of the aluminum electrode after chemical conversion (the electrode for an aluminum electrolytic capacitor) and then a cathode layer is formed on the surface of the solid electrolyte layer. Thereafter, the obtained product is sheathed with resin or the like. In this process, an anode terminal to be electrically connected to the anode and a cathode terminal to be electrically connected to the cathode layer are provided. In this case, a plurality of pieces of anode foil may be laminated. In the aluminum electrolytic capacitor having the constitution described above, when the hydration resistance of the electrode for an aluminum electrolytic capacitor is low, the chemical conversion coating may deteriorate due to water entering through a sheath such as resin, and thus the electrode for an aluminum electrolytic capacitor is required to have a high hydration resistance.

(Method for Manufacturing Electrode for Aluminum Electrolytic Capacitor)

Figure 2:
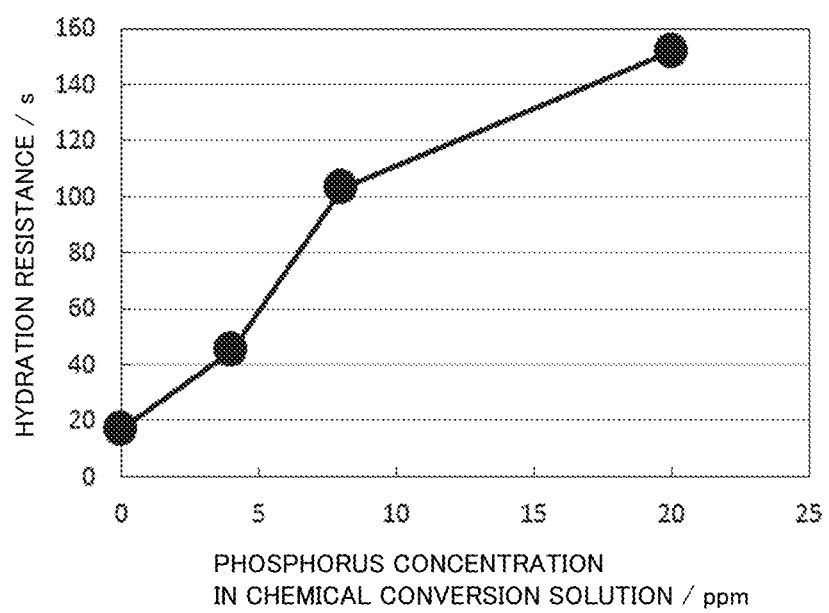
FIG. 2 is a graph illustrating a relation between phosphorus concentration in a chemical conversion solution and hydration resistance in the method for manufacturing an electrode for an aluminum electrolytic capacitor to which the present invention is applied.
Figure 3:
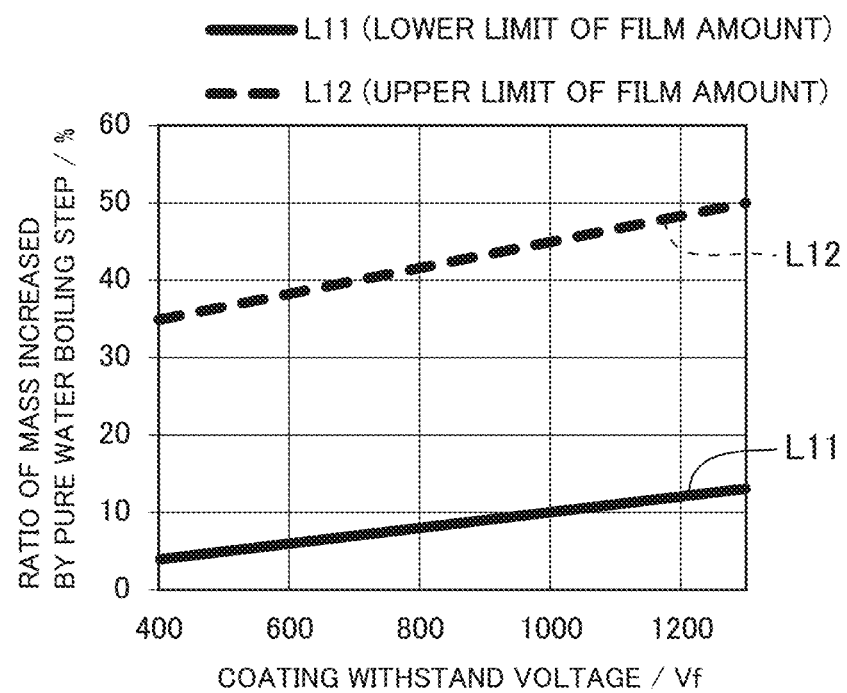
FIG. 3 is a graph illustrating a range of an appropriate amount of an aluminum hydrated film to be formed at hydration steps (a first hydration step and a second hydration step) in the method for manufacturing an electrode for an aluminum electrolytic capacitor to which the present invention is applied.

FIG. 1 is a flowchart illustrating a method for manufacturing an electrode for an aluminum electrolytic capacitor to which the present invention is applied. FIG. 2 is a graph illustrating a relation between phosphorus concentration in a chemical conversion solution and the hydration resistance in the method for manufacturing an electrode for an aluminum electrolytic capacitor to which the present invention is applied. FIG. 3 is a graph illustrating a range of an appropriate amount of an aluminum hydrated film to be formed at hydration steps (a first hydration step and a second hydration step) in the method for manufacturing an electrode for an aluminum electrolytic capacitor to which the present invention is applied.

As illustrated in FIG. 1, in the method for manufacturing an electrode for an aluminum electrolytic capacitor to which the present invention is applied, at the first hydration step ST1, an aluminum electrode such as foil formed by etching aluminum foil or a porous aluminum electrode formed by sintering aluminum powder and laminating the resultant porous layers onto both surfaces of an aluminum core material is immersed in a first hydration processing solution having a temperature of 70° C. or higher, more specifically a temperature of 70° C. to 100° C. to form a hydrated film on the aluminum electrode.

The first hydration processing solution used at the first hydration step ST1 includes pure water or an aqueous solution to which phosphoric acid or a phosphate has been added such that the phosphorus concentration is 4 mass ppm or lower. The first hydration processing solution contains phosphoric acid or a phosphate, which means that one type or two types or more of orthophosphoric acid, hypophosphorous acid, phosphorous acid, diphosphoric acid, ammonium dihydrogenphosphate, diammonium hydrogenphosphate, and triammonium phosphate have been added to pure water. The pH of the first hydration processing solution is 6.0 to 7.5. If the phosphorus concentration in the first hydration processing solution exceeds 4 mass ppm, the amount of the hydrated film formed at the first hydration step ST1 decreases, and thus the thickness of the hydrated film at the time of starting chemical conversion is insufficient and a stable chemical conversion coating cannot be formed.

Subsequently, the second hydration step ST2 is performed. At the second hydration step ST2, the aluminum electrode is immersed in a second hydration processing solution to which phosphoric acid or a phosphate has been added such that the phosphorus concentration is 4 mass ppm to 5000 mass ppm. Consequently, on the aluminum electrode, the hydrated film grows. Specifically, although the second hydration processing solution contains phosphorus, the phosphorus concentration is low and the pH is 3.0 to 9.0, and thus, in the aluminum electrode, growth of the hydrated film to which phosphoric acid is bonded progresses more than dissolution of the hydrated film formed at the first hydration step. Thus, if the phosphorus concentration or the pH of the second hydration processing solution does not satisfy the above-described conditions, the amount of the hydrated film formed at the second hydration step ST2 decreases, and the hydrated film dissolves in extreme cases. Consequently, the thickness of the hydrated film at the time of starting chemical conversion is insufficient and a stable chemical conversion coating cannot be formed.

The second hydration processing solution contains one type or two types or more of orthophosphoric acid, hypophosphorous acid, phosphorous acid, diphosphoric acid, ammonium dihydrogenphosphate, diammonium hydrogenphosphate, and triammonium phosphate, and has a pH of 3.0 to 9.0. The temperature when performing the second hydration step ST2 is 70° C. or higher, more specifically 70° C. to 100° C.

Subsequently, a chemical conversion step ST3 is performed to form a chemical conversion coating having a coating withstand voltage of 200 V or higher on the aluminum electrode. Subsequently, the aluminum electrode is cleaned with pure water, and then dried, whereby an aluminum electrode for an electrolytic capacitor on which the chemical conversion coating is formed can be obtained. At this chemical conversion step ST3, the chemical conversion coating is formed by both of dehydration reaction of the hydrated film and anodic oxidation reaction of aluminum.

The chemical conversion step ST3 includes at least a boric acid chemical conversion process of performing chemical conversion on the aluminum electrode in a boric acid-based chemical conversion solution. Specifically, at the chemical conversion step ST3, chemical conversion may be performed in the boric acid-based chemical conversion solution through the entire step, or chemical conversion in the boric acid-based chemical conversion solution and chemical conversion in an organic acid-based chemical conversion solution using organic acid such as ammonium adipate may be combined. The boric acid-based chemical conversion solution is an aqueous solution containing boric acid or a salt thereof, and chemical conversion is performed on the aluminum electrode under conditions in which the specific resistance measured at 90° C. is 10 Ωm to 1500 Ωm and the liquid temperature of the chemical conversion solution is 40° C. to 95° C. In the case of using the organic acid-based chemical conversion solution, chemical conversion is performed on the aluminum electrode in an aqueous solution having a specific resistance of 5 Ωm to 500 Ωm measured at 50° C. under a condition of a liquid temperature of 40° C. to 90° C.

In the case of combining chemical conversion in the boric acid-based chemical conversion solution and chemical conversion in the organic acid-based chemical conversion solution, for example, the chemical conversion in the organic acid-based chemical conversion solution is performed at a chemical conversion voltage or to a voltage lower than the chemical conversion voltage, and then the chemical conversion in the boric acid-based chemical conversion solution is performed. When the chemical conversion solutions or types of the chemical conversion solutions are changed during chemical conversion, the aluminum electrode is cleaned with pure water. Herein, as chemical conversion in a chemical conversion solution other than the boric acid-based chemical conversion solution, chemical conversion in a phosphoric acid-based chemical conversion solution may be combined with the chemical conversion in the boric acid-based chemical conversion solution.

In any case using any of the chemical conversion solutions, during the chemical conversion step, one or more depolarization steps and an additional chemical conversion step is performed. As the depolarization step, depolarization treatment such as thermal depolarization treatment for heating the aluminum electrode and in-liquid depolarization treatment of immersing the aluminum electrode in an aqueous solution containing phosphate ions, for example, are performed. In the thermal depolarization treatment, for example, the treatment temperature is 450° C. to 550° C., and the treatment time is 2 minutes to 10 minutes. In the in-liquid depolarization treatment, the aluminum electrode is immersed in an aqueous solution of 20-mass % to 30-mass % phosphoric acid for 5 minutes to 15 minutes depending on the coating withstand voltage under a condition of a liquid temperature of 60° C. to 70° C. In the in-liquid depolarization treatment, no voltage is applied to the aluminum electrode. During the increase in applied voltage to the chemical conversion voltage, an intermediate process of immersing the aluminum electrode in an aqueous solution containing phosphate ions may be performed. In this intermediate process, the aluminum electrode is immersed in a phosphoric acid aqueous solution having a liquid temperature of 40° C. to 80° C. and having a specific resistance of 0.1 Ωm to 5 Ωm measured at 60° C. for a period of 3 minutes to 30 minutes. By this intermediate process, aluminum hydroxide precipitated at the chemical conversion step ST3 can be efficiently removed. In addition, phosphate ions can be taken into the chemical conversion coating by the intermediate process, and thus the stability of the chemical conversion coating such as being able to improve durability for immersion in boiling water or acidic solution can be effectively improved.

In the present embodiment, the phosphorus concentration in the chemical conversion solution used at the chemical conversion step ST3 is controlled to be 4 mass ppm or lower. If the phosphorus concentration in the chemical conversion solution used at the chemical conversion step ST3 exceeds 4 mass ppm, the chemical conversion coating does not grow stably as illustrated in FIG. 2, and thus the number of defects in the chemical conversion coating increases and the hydration resistance deteriorates.

In the present embodiment, when a ratio x of mass increased by the first hydration step ST1 and the second hydration step ST2 is represented by the following formula (Mathematical formula 1), the amount of the hydrated film at the time when the first hydration step ST1 and the second hydration step ST2 have been completed is preferably set within a range from the lower limit of x indicated by the solid line L11 in FIG. 3 to the upper limit of x indicated by the broken line L12 in FIG. 3.

[Mathematical formula 1]

$$\text{Ratio } x\ (\%) \text{ of mass increased by pure water boiling step} = \frac{\text{Mass (g) increased by pure water boiling step}}{\text{Mass (g) of aluminum electrode 10 before pure water boiling}} \times 100$$

$$= \frac{(\text{Mass (g) of aluminum electrode 10 after pure water boiling}) - (\text{Mass (g) of aluminum electrode 10 before pure water boiling})}{\text{Mass (g) of aluminum electrode 10 before pure water boiling}} \times 100$$

withstand voltage of a chemical conversion coating is represented by Vf (V) and the ratio of mass increased by the first hydration step ST1 and the second hydration step ST2 is represented by x, the solid line L11 indicating the lower limit of x is represented by the following formula.

$$x=(0.01 \times Vf)$$

The broken line L12 indicating the upper limit of x is represented by the following formula.

$$x=(0.017 \times Vf+28)$$

Thus, in the present embodiment, conditions of the first hydration step ST1 and the second hydration step ST2 are preferably set such that the coating withstand voltage Vf (V) and the ratio x (mass %) satisfy the following conditional formula.

$$(0.01 \times Vf) \le x \le (0.017 \times Vf+28)$$

If the amount of the hydrated film is appropriate, a sufficiently thick chemical conversion coating can be formed by a smaller amount of electricity at the chemical conversion step ST3. In contrast, if x is lower than the lower limit of the above-described conditional formula, excessive heat is generated at the chemical conversion step ST3, and a stable chemical conversion coating is not formed.

(Electrode for Aluminum Electrolytic Capacitor)

Figure 6:
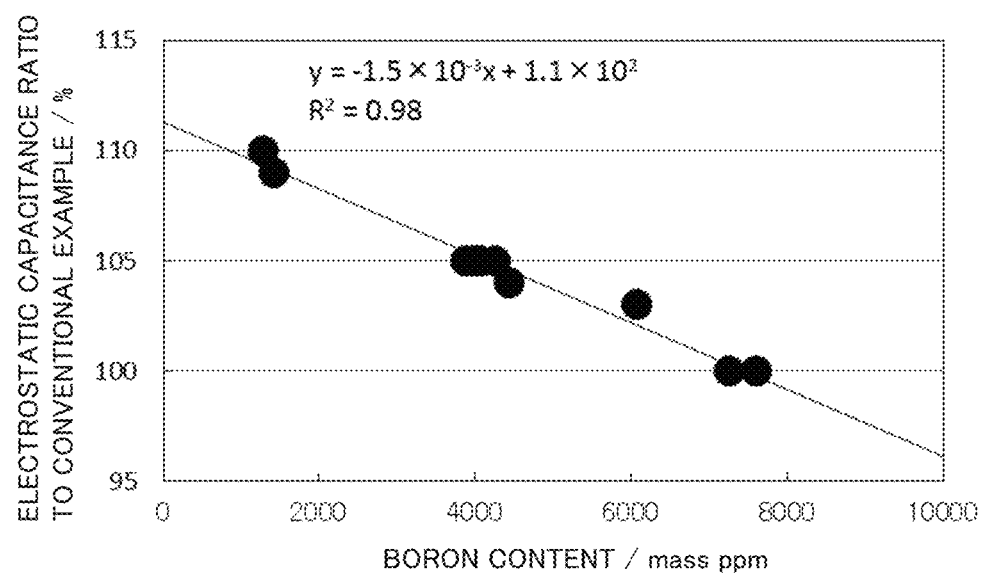
FIG. 6 is a graph illustrating a relation between boron content in a chemical conversion coating and electrostatic capacitance.

As described with reference to FIG. 6, the electrostatic capacitance tends to decrease as the amount of boron taken into the chemical conversion coating increases. In contrast, in the electrode for an aluminum electrolytic capacitor manufactured in the present embodiment, the chemical conversion coating is formed using the boric acid-based chemical conversion solution, and thus the chemical conversion coating contains boron. However, the boron content in the chemical conversion coating is 100 mass ppm to 6000 mass ppm, and the boron content in the chemical conversion coating is low. Thus, reduction of permittivity due to boric acid or boron in the chemical conversion coating can be suppressed, whereby the electrostatic capacitance can be improved.

The reason for this is considered as follows. In the present embodiment, a hydrated film is formed on an aluminum electrode at the first hydration step ST1 illustrated in FIG. 1, and then at the second hydration step ST2, the aluminum electrode is immersed in a second hydration processing solution to which phosphoric acid or a phosphate has been added such that the phosphorus concentration is 4 mass ppm to 5000 mass ppm, whereby the hydrated film is caused to grow. At this time, because the temperature of the second hydration processing solution is 70° C. or higher, the hydrated film to which phosphoric acid is strongly bonded grows. Thus, boric acid in the chemical conversion solution is prevented from being adsorbed on the hydrated film, whereby the boric acid is prevented from being taken into the chemical conversion coating.

At the second hydration step ST2, because the temperature of the second hydration processing solution is 70° C. or higher, the hydrated film to which phosphoric acid is strongly bonded grows. Thus, the phosphoric acid can be prevented from being separated from the hydrated film and being eluted into the chemical conversion solution at the chemical conversion step ST3. Thus, the phosphate concentration in the chemical conversion solution can be prevented from increasing, whereby the chemical conversion coating is formed appropriately. Consequently, the number of defects in the chemical conversion coating can be reduced, and thus the hydration resistance can be improved.

In the electrode for an aluminum electrolytic capacitor in the present embodiment, as described with reference to FIG. 4 and FIG. 5, the number of defects (voids) that are exposed on a cut surface when the chemical conversion coating is cut is 150 voids/$\mu m^2$ or smaller, and the number of the defects is preferably 100 voids/$\mu m^2$ or smaller. Consequently, water is less likely to enter from the surface of the chemical conversion coating, and thus the chemical conversion coating is less likely to undergo deterioration caused by hydration, whereby the hydration resistance of the chemical conversion coating can be improved.

(Method for Examining Defects in Chemical Conversion Coating)

Figure 4A:
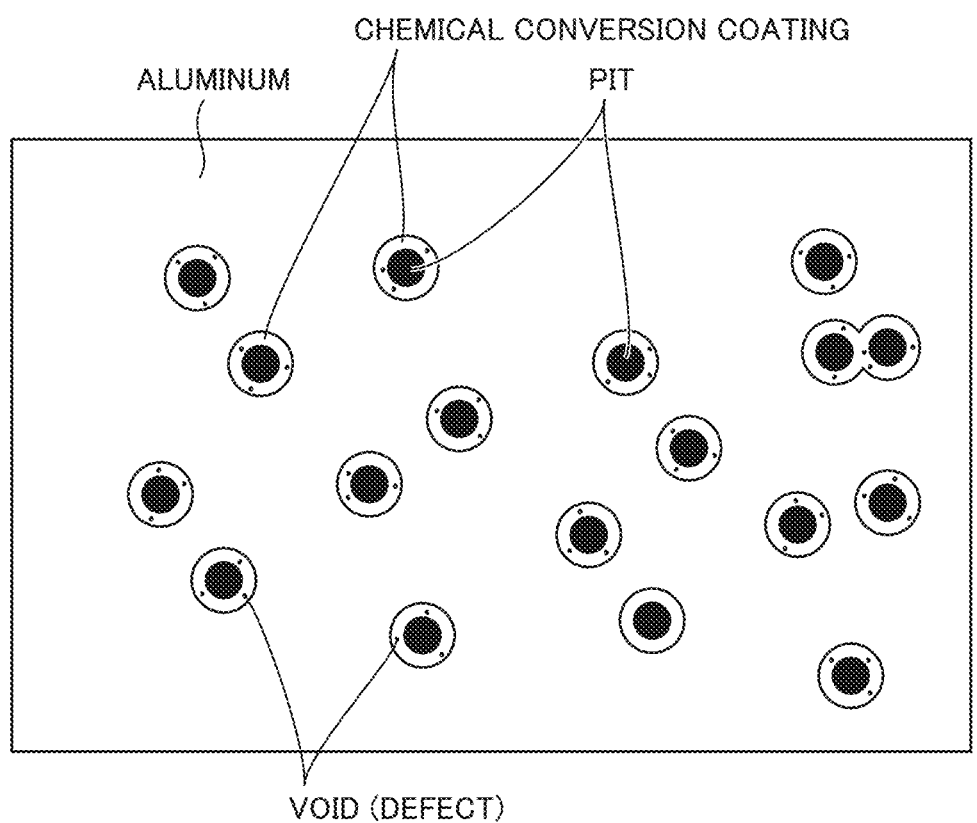
FIG. 4A is explanatory diagrams illustrating a method for examining voids (defects) in a chemical conversion coating of an electrode for an aluminum electrolytic capacitor.
Figure 4B:
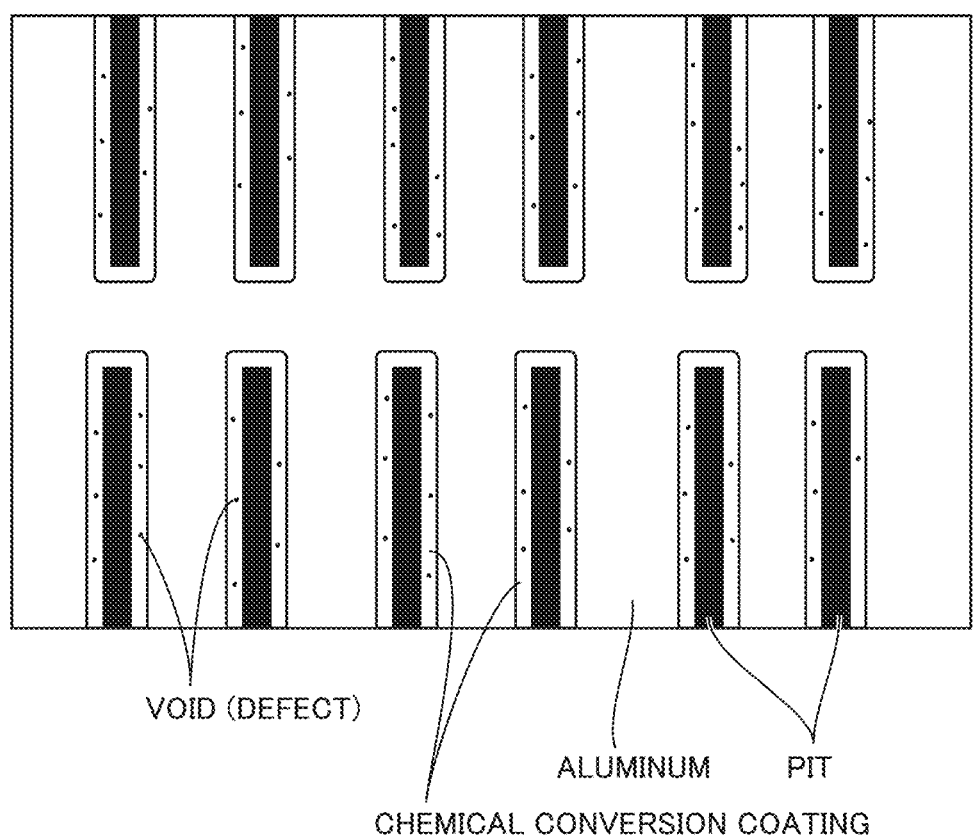
FIG. 4B is explanatory diagrams illustrating a method for examining voids (defects) in a chemical conversion coating of an electrode for an aluminum electrolytic capacitor.

FIG. 4A and FIG. 4B are explanatory diagrams illustrating a method for examining voids (defects) in a chemical conversion coating of an electrode for an aluminum electrolytic capacitor. FIG. 5 is an explanatory diagram of the voids (defects) in the chemical conversion coating of the electrode for an aluminum electrolytic capacitor. In FIG. 5, in order for the presence of voids to be easily identified, a photograph of a cross section of a chemical conversion coating in which many voids are present, which was observed with a FE-SEM, is illustrated.

Figure 5:
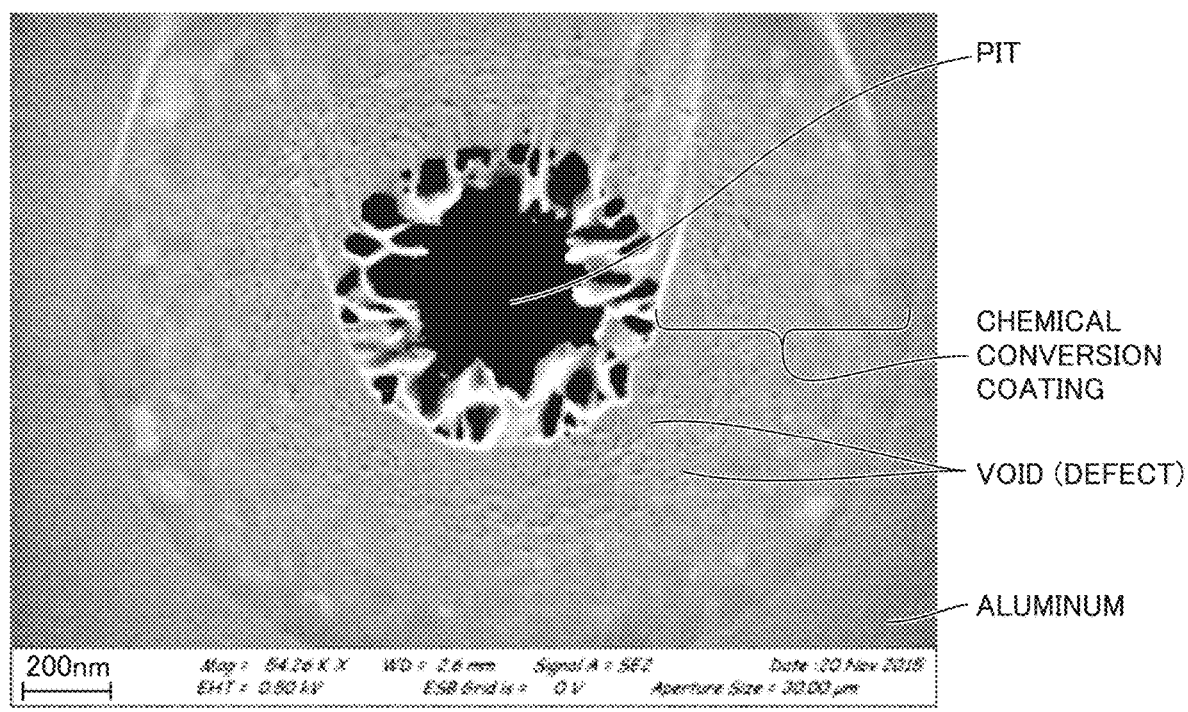
FIG. 5 is an explanatory diagram of the voids (defects) in the chemical conversion coating of the electrode for an aluminum electrolytic capacitor.

FIG. 4A and FIG. 5 illustrate a case in which, along a surface of an electrode for an aluminum electrolytic capacitor including a chemical conversion coating formed on foil formed by etching aluminum foil, the chemical conversion coating is cut, and tunnel-like pits are indicated as black areas. Around each pit, the chemical conversion coating is present. As illustrated in FIG. 5, because voids (defects) are exposed on the cut surface of the chemical conversion coating, the number of the voids per 1 $\mu m^2$ can be measured.

Herein, the chemical conversion coating may be cut along pits as illustrated in FIG. 4B. In this case also, voids (defects) are exposed on the cut surface of the chemical conversion coating, and thus the number of voids per 1 $\mu m^2$ can be measured.

EXAMPLES

The following describes Examples and other examples of the present invention. Table 1 gives conditions (phosphorus concentration, pH, temperature, time) of the first hydration step ST1 and the second hydration step ST2 according to conditions (Conditions 1 to 13) for manufacturing an electrode for an aluminum electrolytic capacitor. Table 2 gives conditions (boric acid concentration, boric acid ammonium concentration, phosphorus concentration, pH, temperature) of the chemical conversion step ST3 according to the conditions (Conditions 1 to 13) for manufacturing an electrode for an aluminum electrolytic capacitor. Table 3 gives characteristics (boron content, electrostatic capacitance ratio, hydration resistance) of electrodes for an aluminum electrolytic capacitor corresponding to the conditions (Conditions 1 to 13) for manufacturing an electrode for an aluminum electrolytic capacitor.

In any of Conditions 1 to 13, a porous aluminum electrode formed by sintering aluminum powder having an average particle diameter D50 of 3 micrometers and laminating the resultant porous layers onto both surfaces of an aluminum core material each in a thickness of 50 micrometers was used as an aluminum electrode.

The phosphorus concentration and the pH of each of first hydration processing solutions used at the first hydration step ST1 and second hydration processing solutions used at the second hydration step ST2 were adjusted with 85% orthophosphoric acid and ammonia water.

Chemical conversion solutions used at the chemical conversion step ST3 were boric acid-based chemical conversion solutions containing boric acid and boric acid ammonium dissolved in pure water, and chemical conversion was performed using each boric acid-based chemical conversion solution through the entire chemical conversion step ST3. At the chemical conversion step ST3, immersion into an orthophosphoric acid aqueous solution at 40 g/L and at 70° C. was performed once, and depolarization treatment by heat treatment at 500° C. was performed three times. The chemical conversion voltage was 600 V.

As for the boron content, an aluminum electrode (electrode for an aluminum electrolytic capacitor) after the chemical conversion was dissolved in 9M sulfuric acid, and then the amount of boron (Xb mg) was measured by ICP emission spectrometry. Another sample on which the same chemical conversion as described above had been performed was prepared in an amount having the same area as described above, and the mass thereof was measured. Subsequently, the sample was immersed in a solution containing bromine dissolved in methanol to dissolve aluminum that was present as a metal, and the mass (X0 mg) of the chemical conversion coating after dissolution was measured. Using these values, the boron content was calculated by the following formula.

$$\text{Boron content} = (X_b/X_0) \times 10^6 \text{ mass ppm}$$

Measurement results of the hydration resistance are results of measurement according to "The methods of electrode foil for aluminium electrolytic capacitors" provided in EIAJ RC 2364A and, for example, the hydration resistance is given as a period of time (seconds/s) until the applied voltage was raised to the coating withstand voltage when a constant current was applied after each sample was immersed in pure water at 95° C. or higher for 60±1 minutes. More specifically, a 10 mm×50 mm electrode for an aluminum electrolytic capacitor was immersed in pure water having a temperature of 95° C. or higher for 60±1 minutes, and then a constant direct current of 2.0±0.2 mA was flown in a 7-mass % boric acid aqueous solution (the specific resistance at a temperature of 70±2° C. was 75±3 Ωm, and the pH at a temperature of 50±2° C. was 2.7 to 4.2) having a temperature of 85±2° C. At this time, a period of time (seconds) until a voltage corresponding to 90% of the rated coating withstand voltage was reached is used as the hydration resistance.

TABLE 1

| | First hydration step ST1 (First hydration processing solution) | | | | Second hydration step ST2 (Second hydration processing solution) | | | |
|---|---|---|---|---|---|---|---|---|
| | Phosphorus concentration (mass ppm) | pH | Temperature (° C.) | Time (min) | Phosphorus concentration (mass ppm) | pH | Temperature (° C.) | Time (min) |
| Condition1 | 0 | 6.7 | 95 | 10 | 120 | 5.5 | 95 | 5 |
| Condition2 | 0 | 6.7 | 95 | 10 | 120 | 5.5 | 95 | 5 |
| Condition3 | 0 | 6.7 | 95 | 10 | 120 | 5.5 | 95 | 5 |
| Condition4 | 0 | 6.7 | 95 | 10 | 120 | 5.5 | 95 | 5 |
| Condition5 | 20 | 6.7 | 95 | 10 | 120 | 5.5 | 95 | 5 |
| Condition6 | 0 | 6.7 | 95 | 10 | 120 | 5.5 | 30 | 5 |
| Condition7 | 0 | 6.7 | 95 | 10 | 4000 | 5.5 | 30 | 5 |
| Condition8 | 0 | 6.7 | 95 | 10 | — | 6.7 | 95 | 5 |
| Condition9 | 0 | 6.7 | 95 | 10 | 120 | 7.3 | 95 | 5 |
| Condition10 | 0 | 6.7 | 95 | 10 | 120 | 7.9 | 95 | 5 |
| Condition11 | 0 | 6.7 | 95 | 10 | 40 | 2.5 | 95 | 5 |
| Condition12 | 0 | 6.7 | 95 | 10 | 20 | 3.2 | 95 | 5 |
| Condition13 | 0 | 6.7 | 95 | 10 | 4000 | 5.5 | 95 | 5 |

TABLE 2

| | Boric acid concentration (mass %) | Boric acid ammonium concentration (mass %) | Phosphorus concentration (mass ppm) | pH | Temperature (° C.) |
|---|---|---|---|---|---|
| Condition1 | 8 | 0.6 | 0 | 3.7 | 85 |
| Condition2 | 8 | 0.6 | 4 | 3.7 | 85 |
| Condition3 | 8 | 0.6 | 8 | 3.7 | 85 |
| Condition4 | 8 | 0.6 | 20 | 3.7 | 85 |
| Condition5 | 8 | 0.6 | 0 | 3.7 | 85 |
| Condition6 | 8 | 0.6 | 0 | 3.7 | 85 |
| Condition7 | 8 | 0.6 | 0 | 3.7 | 85 |
| Condition8 | 8 | 0.6 | 0 | 3.7 | 85 |
| Condition9 | 8 | 0.6 | 0 | 3.7 | 85 |
| Condition10 | 8 | 0.6 | 0 | 3.7 | 85 |
| Condition11 | 8 | 0.6 | 0 | 3.7 | 85 |
| Condition12 | 8 | 0.6 | 0 | 3.7 | 85 |
| Condition13 | 8 | 0.6 | 0 | 3.7 | 85 |

TABLE 3

|  | Boron content (mass ppm) | Electrostatic capacitance ratio to Condition 8 | Hydration resistance (s) |
| --- | --- | --- | --- |
| Condition1 | 3990 | 105% | 17 |
| Condition2 | 4040 | 105% | 45 |
| Condition3 | 3880 | 105% | 103 |
| Condition4 | 4070 | 105% | 152 |
| Condition5 | 6060 | 103% | 180 |
| Condition6 | 7250 | 100% | 25 |
| Condition7 | 4430 | 104% | 21 |
| Condition8 | 7590 | 100% | 32 |
| Condition9 | 4010 | 105% | 25 |
| Condition10 | 4260 | 105% | 34 |
| Condition11 | 1420 | 109% | 150 |
| Condition12 | 1280 | 110% | 32 |
| Condition13 | 3950 | 105% | 18 |

In Conditions 1 to 13 given in Tables 1 to 3, Conditions 1, 2, 9, 10, 12, and 13 are Examples of the present invention, Conditions 3 to 7 and 11 are Comparative Examples, and Condition 8 is Conventional Example.

As given in Tables 1 to 3, in each of Conditions 1 to 4, 9, and 10 to 13, the aluminum electrode was immersed in the first hydration processing solution at the first hydration step ST1, and was then immersed in the second hydration processing solution having a temperature of 95° C. at the second hydration step ST2, and thus the boron content in the chemical conversion coating was 6000 mass ppm or lower. Consequently, with reference to Condition 8 (Conventional Example), the electrostatic capacitance increased by 5% or more.

In each of Conditions 1, 2, 9, 10, 12, and 13 (Examples) out of Conditions 1 to 4, 9, 10 to 13, the phosphorus concentration in the chemical conversion solution was 0 mass ppm or 4 mass ppm, and thus the chemical conversion coating having a smaller number of defects could be formed. More specifically, the number of voids that were exposed on a cut surface when the chemical conversion coating was cut was 150 voids/$\mu m^2$ or smaller. Consequently, according to Conditions 1, 2, 9, 10, 12, and 13, excellent electrodes for an aluminum electrolytic capacitor each having a hydration resistance of 100 seconds or shorter could be obtained.

In contrast, in Conditions 3 and 4 (Comparative Examples), the phosphorus concentrations in the chemical conversion solution were 8 mass ppm and 20 mass ppm, respectively, and thus the number of defects in the chemical conversion coating increased, and the hydration resistances tended to decrease. It is considered that this is because the chemical conversion coating and aluminum partially dissolved due to phosphate ions that were present in the chemical conversion solution, and a stable chemical conversion coating was not formed, and thus the number of defects increased. In each of Conditions 3 and 4, the number of voids that were exposed on a cut surface when the chemical conversion coating was cut exceeded 150 voids/$\mu m^2$.

Thus, the phosphorus concentration in the chemical conversion solution is preferably kept to be 4 mass ppm or lower. In the above-described studies, it is considered that the electrostatic capacitance increased by 11% in Condition 12 (Example) for the reasons that the effect of preventing boron from being taken was great because the pH of the second hydration processing solution used at the second hydration step ST2 was 3.2, which is lower than those in other Examples, and thus the hydrated film reacted with phosphoric acid more and the content of phosphoric acid strongly bonded thereto was accordingly much higher than those in other Examples.

In contrast, in Condition 5 (Comparative Example), the aluminum electrode was immersed in the hydration processing solution containing phosphorus at 20 ppm (4 ppm or more) at the first hydration step ST1, and thus hydration reaction was hindered by the presence of phosphoric acid, and a sufficiently thick hydrated film was not formed. Consequently, the period of time for chemical conversion was longer, the boron content in the chemical conversion coating exceeded 6000 mass ppm, and the electrostatic capacitance increased by only 3% with respect to Condition 8 (Conventional Example). Furthermore, because many defects were present in the chemical conversion coating, the hydration resistance tended to decrease. Herein, the number of voids that were exposed on a cut surface when the chemical conversion coating was cut was 150 voids/$\mu m^2$ or larger.

In Condition 6 (Comparative Example), because the temperature of the hydration processing solution at the second hydration step ST2 was 30° C., a hydrated film to which phosphoric acid was strongly bonded was not formed, and thus the boron content in the chemical conversion coating exceeded 6000 mass ppm and the electrostatic capacitance did not increase.

In Condition 11 (Comparative Example), because the pH of the hydration processing solution used at the second hydration step ST2 was lower than 3.0, the effect of dissolving the hydrated film formed at the first hydration step ST1 was strong, whereby the water resistance was reduced.

In Condition 7 (Comparative Example), although the temperature of the hydration processing solution at the second hydration step ST2 was 30° C., the phosphorus concentration in the hydration processing solution used at the second hydration step ST2 was 4000 mass ppm. Thus, the boron content in the chemical conversion coating was 6000 mass ppm or lower, and the electrostatic capacitance increased by 4% with respect to the Condition 8 (Conventional Example). However, because the temperature of the hydration processing solution at the second hydration step ST2 was 30° C., bond between phosphorus and the hydrated film was weak, and phosphoric acid was more likely to be eluted from the aluminum electrode into the chemical conversion solution. Thus, when chemical conversion on the aluminum electrode in the same chemical conversion solution had been repeated five times or more, phosphorus concentration in the chemical conversion solution increased to 5 mass ppm. Consequently, as can be seen from comparison results with Conditions 1 to 4, the hydration resistance of the chemical conversion coating decreased. Thus, it is preferable for the hydration processing solution (second hydration processing solution) used at the second hydration step ST2 that the phosphorus concentration be 4 mass ppm to 5000 mass ppm and the temperature be 70° C. or higher. In contrast, in Condition 13 (Example), only the temperature of the second hydration processing solution was changed to 95° C. from that in Condition 7, and phosphoric acid strongly bonded to the hydrated film increased, and thus the phosphoric acid was less likely to be eluted into the chemical conversion solution. Consequently, increase in phosphorus concentration due to repeated chemical conversion as observed in Condition 7 did not occur.

(Other Embodiments)

In the embodiment described above, before the chemical conversion step ST3, the first hydration step ST1 and the second hydration step ST2 are performed as hydration steps.

However, another hydration step (third hydration step) may be performed once or a plurality of times after the second hydration step ST2. In this case, the hydration processing solution also used at the third hydration step is prepared such that the phosphorus concentration is 0 to 5000 mass ppm, the pH is 3.0 to 9.0, and the temperature is 70° C. or higher.

In Examples described above, as the aluminum electrode, a porous aluminum electrode formed by sintering aluminum powder and laminating the resultant porous layers onto both surfaces of an aluminum core material was used. However, also when foil formed by etching aluminum foil was used, similar results were obtained.

As a result of studying various conditions in addition to Examples described above, a result was obtained indicating that the electrostatic capacitance could be improved in a chemical conversion coating having a coating withstand voltage of 200 V or higher and furthermore the hydration resistance of the chemical conversion coating could be improved if the above-described conditions were satisfied. In particular, a chemical conversion coating having a coating withstand voltage of 400 V or higher has such a problem that defects are less likely to be repaired during chemical conversion, for example. However, results were obtained in which occurrence of defects, for example, could be prevented and the hydration resistance, for example, could be improved if the above-described conditions were satisfied.

REFERENCE SIGNS LIST

ST1 . . . first hydration step, ST2 . . . second hydration step, ST3 . . . chemical conversion step

The invention claimed is:

1. An electrode for an aluminum electrolytic capacitor, the electrode having an aluminum electrode on which a chemical conversion coating having a coating withstand voltage of 200 V or higher is formed, wherein
    boron content in the chemical conversion coating is 100 mass ppm to 6000 mass ppm, and
    hydration resistance is 100 seconds or shorter, the hydration resistance being a period of time (seconds) until a voltage corresponding to 90% of a rated coating withstand voltage is reached when a 10 mm×50 mm electrode for an aluminum electrolytic capacitor is immersed in pure water having a temperature of 95° C. or higher for 60±1 minutes and then a constant direct current of 2.0±0.2 mA is flown in a 7-mass % boric acid aqueous solution (specific resistance at a temperature of 70±2° C. is 75±3 Ωm, and pH at a temperature of 50±2° C. is 2.7 to 4.2) having a temperature of 85±2° C.

2. The electrode for an aluminum electrolytic capacitor according to claim 1, wherein the coating withstand voltage is 400 V or higher.

3. The electrode for an aluminum electrolytic capacitor according to claim 1, wherein the number of voids that are exposed on a cut surface when the chemical conversion coating is cut is 150 voids/μm² or smaller.

4. A method for manufacturing an electrode for an aluminum electrolytic capacitor, the method comprising:
    a first hydration step of immersing an aluminum electrode in a first hydration processing solution having a temperature of 70° C. or higher and including pure water or an aqueous solution to which phosphoric acid or a phosphate has been added such that phosphorus concentration is 4 mass ppm or lower;
    a second hydration step of, after the first hydration step, immersing the aluminum electrode in a second hydration processing solution to which phosphoric acid or a phosphate has been added such that the phosphorus concentration is 4 mass ppm to 5000 mass ppm, the second hydration processing solution having a pH of 3.0 to 9.0 and a temperature of 70° C. or higher; and
    a chemical conversion step of, after the second hydration step, forming on the aluminum electrode a chemical conversion coating having a coating withstand voltage of 200 V or higher, the chemical conversion step including at least a boric acid chemical conversion process of performing chemical conversion on the aluminum electrode in a boric acid-based chemical conversion solution.

5. The method for manufacturing an electrode for an aluminum electrolytic capacitor according to claim 4, wherein a chemical conversion coating having a coating withstand voltage of 400 V or higher is formed at the chemical conversion step.

6. The method for manufacturing an electrode for an aluminum electrolytic capacitor according to claim 4, wherein the coating withstand voltage Vf (V) and x mass % satisfies a conditional formula:

$(0.01 \times Vf) \leq x \leq (0.017 \times Vf + 28)$ where x mass % is, at a time when the first hydration step and the second hydration step have been completed, a ratio of the mass of the hydrated film formed on the aluminum electrode by the first hydration step and the second hydration step to the mass of the aluminum electrode before the first hydration step.

7. The method for manufacturing an electrode for an aluminum electrolytic capacitor according to claim 4, wherein the phosphorus concentration in the chemical conversion solution used at the chemical conversion step is 4 mass ppm or lower.

8. The method for manufacturing an electrode for an aluminum electrolytic capacitor according to claim 4, wherein the second hydration processing solution contains one type or two types or more of orthophosphoric acid, hypophosphorous acid, phosphorous acid, diphosphoric acid, ammonium dihydrogenphosphate, diammonium hydrogenphosphate, and triammonium phosphate.

* * * * *